United States Patent
Moeys et al.

(10) Patent No.: US 12,445,737 B2
(45) Date of Patent: Oct. 14, 2025

(54) APPARATUS FOR A DYNAMIC VISION SENSOR AND METHOD FOR ADJUSTING A DYNAMIC VISION SENSOR

(71) Applicant: Sony Semiconductor Solutions Corporation, Atsugi (JP)

(72) Inventors: Diederik Paul Moeys, Stuttgart (DE); Oliver Erdler, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 223 days.

(21) Appl. No.: 18/265,984

(22) PCT Filed: Dec. 22, 2021

(86) PCT No.: PCT/EP2021/087219
§ 371 (c)(1),
(2) Date: Jun. 8, 2023

(87) PCT Pub. No.: WO2022/136510
PCT Pub. Date: Jun. 30, 2022

(65) Prior Publication Data
US 2024/0048856 A1    Feb. 8, 2024

(30) Foreign Application Priority Data
Dec. 22, 2020 (EP) ................................. 20216263

(51) Int. Cl.
| H04N 5/335 | (2011.01) |
| H04N 23/68 | (2023.01) |
| H04N 23/71 | (2023.01) |
| H04N 23/75 | (2023.01) |
| H04N 25/673 | (2023.01) |

(52) U.S. Cl.
CPC .......... *H04N 23/75* (2023.01); *H04N 23/685* (2023.01); *H04N 23/71* (2023.01); *H04N 25/673* (2023.01)

(58) Field of Classification Search
CPC ...................................................... H04N 23/75
See application file for complete search history.

(56) References Cited

U.S. PATENT DOCUMENTS

| 10,410,077 B2 | 9/2019 | Cho et al. |
| 10,447,920 B2 | 10/2019 | Horesh |

(Continued)

FOREIGN PATENT DOCUMENTS

| EP | 2800353 A1 | 11/2014 |
| WO | 2020/071267 A1 | 4/2020 |

OTHER PUBLICATIONS

International Search Report and Written Opinion mailed on Mar. 28, 2022, received for PCT Application PCT/EP2021/087219, filed on Dec. 22, 2021, 10 pages.

*Primary Examiner* — Gary C Vieaux
(74) *Attorney, Agent, or Firm* — XSENSUS LLP

(57) ABSTRACT

Embodiments of the present disclosure provide an apparatus for a dynamic vision sensor and a method for adjusting a dynamic vision sensor. The apparatus comprises an actuator configured to change an optical path of light impinging on a pixel array of the DVS relative to the pixel array to cause the pixel array to detect one or more events resulting from the actuator changing the optical path of the light relative to the pixel array. Also, the apparatus comprises a control circuit configured to adjust the DVS based on the one or more events.

20 Claims, 5 Drawing Sheets

(56) References Cited

U.S. PATENT DOCUMENTS

2018/0342081 A1 11/2018 Kim et al.
2019/0014258 A1* 1/2019 Horesh ................. H04N 23/71
2021/0274081 A1* 9/2021 Naganuma ........... H04N 25/683

* cited by examiner

APPARATUS FOR A DYNAMIC VISION SENSOR AND METHOD FOR ADJUSTING A DYNAMIC VISION SENSOR

CROSS-REFERENCE TO RELATED APPLICATIONS

The present application is based on PCT filing PCT/EP2021/087219, filed Dec. 22, 2021, and claims priority to EP Application Serial No. 20216263.2, filed Dec. 22, 2020, the entire contents of each are incorporated herein by reference.

FIELD

Embodiments of the present disclosure relate to an apparatus for a dynamic vision sensor and a method for adjusting a dynamic vision sensor. In particular, but not exclusively, the present disclosure relates to a concept for calibrating a dynamic vision sensor.

BACKGROUND

Dynamic vision sensors are used in various technical applications, e.g., surveillance and automotive applications.

According to its basic principle, a dynamic vision sensor detects so-called "events" when an illumination and, thus, a light stimulus of a pixel of the dynamic vision sensor changes. Accordingly, for static scenes where there is no movement of objects or contrasts, the dynamic vision sensor may produce mainly noise events and may detect no or an insufficient number of events for calibration of the dynamic vision sensor based on such events.

Hence, there may be a demand for an improved concept for calibrating a dynamic vision sensor.

SUMMARY

This demand may be satisfied by the appended independent and dependent claims.

Embodiments of the present disclosure provide an apparatus for a dynamic vision sensor (DVS) which is configured to detect changes of light impinging on a pixel array of the DVS. The apparatus comprises an actuator configured to change an optical path of the light relative to the pixel array of the DVS to cause the pixel array to detect one or more events resulting from the actuator changing the optical path of the light relative to the pixel array. Also, the apparatus comprises a control circuit configured to adjust the DVS based on the one or more events.

It is noted that, the DVS can be understood as any sensor for event-based imaging, in the sense of an (spatially resolving) imaging concept which provides for imaging changes in the illumination. The DVS may be also referred to as silicon retina or event(-based) vision sensor (EVS). The DVS may be comprised of or correspond to an event camera or neuromorphic camera.

The pixel array, e.g., comprises a plurality of pixels configured to detect the so-called "events" in response to changes in their illumination. In a static scene/environment, objects and contrasts are steady and, therefore, the pixel array may not detect any events except noise events resulting from thermal leakage and/or parasitic photocurrents. Changing the optical path relative to the pixel leads to a shift of the light coming from the static scene/environment and impinging on the pixel array. The events resulting from the shift of the light may also represent steady contrasts and/or objects. In this way the DVS can therefore also a capture static scene/environment and/or steady objects. The DVS, e.g., generates an image of the captured environment based on the events.

The events and/or the image indicate, e.g., whether the DVS is properly/correctly set up to record the environment. The events and/or the image, e.g., indicate whether the DVS is properly adjusted to an illumination and/or whether a focus of the DVS is set up properly. If not, the control circuit may adjust the DVS with respect to the events and/or the image, e.g., for calibration of the DVS. To adjust the DVS, the control circuit, e.g., adjusts the sensitivity (to stimulation) of one or more pixels of the pixel array, the focus of the optics, and/or a processing of the events (e.g. for correction of optical aberration).

As laid out in more detail later, the control circuit in particular may be configured to distinguish events resulting from changing the optical path from noise events based on a direction in which the optical path is changed relative to the pixel array and to adjust the sensitivity based on the noise events, e.g., to reduce an impact of noise.

The actuator, e.g., is configured to move the pixel array and/or optics of the DVS to change the optical path of the light relative to the pixel array. For this, the actuator, e.g., comprises a vibration module, a motor, and/or a piezo element which is coupled to the optics and/or the pixel array and configured to move the pixel array and/or the optics and/or make them vibrate for changing the optical path of the light impinging the pixel array relative to the pixel array. Also, the actuator may be configured to move the whole DVS and/or make it vibrate for changing the optical path relative to the pixel array. For a DVS comprising an in-body stabilization device configured to generate a magnetic field to hold the pixel array using the magnetic field, the actuator, e.g., is configured to modify the magnetic field to move the pixel array and, thus, change the optical path relative to the pixel array.

Further embodiments provide a method for adjusting a DVS which is configured to detect changes of light impinging on a pixel array of the DVS. The method comprises changing an optical path of the light relative to the pixel array of the DVS to cause the pixel array to detect one or more events which result from the actuator changing the optical path of the light relative to the pixel array. Also, the method comprises adjusting the DVS based on the one or more events. Such a method, e.g., may be executed by the apparatus proposed herein. For further aspects and features of optional embodiments of the method, it is referred to explanations in connection with the apparatus proposed herein.

Further embodiments provide a dynamic vision sensor comprising the apparatus proposed herein.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
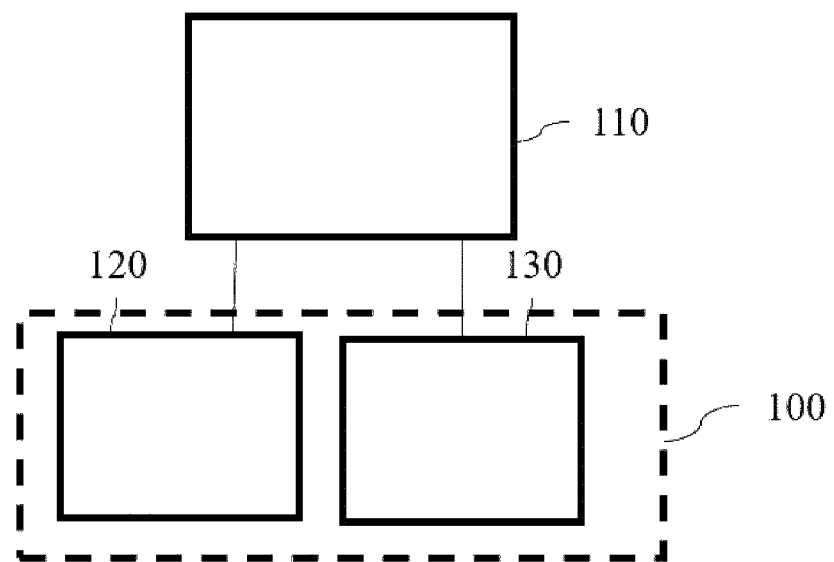
FIG. 1 illustrates a block diagram schematically illustrating an embodiment of the apparatus proposed herein.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates a block diagram schematically illustrating an embodiment of an apparatus 100 for (adjusting) a dynamic vision sensor 110. The dynamic vision sensor (DVS) 110 configured to detect changes of light impinging on a pixel array of the DVS 110.

The apparatus 100, e.g., is implemented in an application of the DVS a surveillance camera, a monitoring system, a mobile device, or any other application of event-based imaging.

The apparatus 100 comprises an actuator 120 and a control circuit 130. In FIG. 1, the apparatus 100 is illustrated as a separate device outside the DVS. In embodiments, e.g., the apparatus 100, the actuator 120, and/or the control circuit 130 is/are implemented in the DVS 110.

The actuator 120 is configured to change an optical path of the light relative to the pixel array of the DVS to cause the pixel array to detect one or more events resulting from the actuator 120 changing the optical path of the light relative to the pixel array. The actuator 120 can be any device capable of changing the above optical path. The actuator 120, e.g., comprises a (small) motor (e.g. a DC motor) or piezoelectric material. The actuator 120, e.g., progressively moves the DVS 110, pixel array, and/or optics of the DVS to change the optical path, e.g., using a DC motor. The actuator 120, e.g., moves the DVS 110 along a predefined (progressive) path through the environment. Depending on the implementation or application, the actuator 120 can be installed inside or outside the DVS 110.

Optionally, the actuator 120 causes the optical path to oscillate for changing the optical path relative to the pixel array. This can be technically easier to implement and more space efficient than moving the optical path progressively. The actuator 120, e.g., comprises a piezoelectric material which can be periodically stimulated to let the DVS, the pixel array, and/or the optics vibrate.

The actuator 120, e.g., moves the pixel array, optics of the DVS 110, and/or the DVS 110 to change the optical path of the light impinging on the pixel array relative to the pixel array. Thus, the actuator 120 causes the DVS 110 to detect, beside noise events, also "representing" events representing the captured environment. To move the pixel array, the DVS 110, and/or the optics, the actuator 120, e.g., is coupled to the DVS, the optics, the pixel array, a device and/or a mount holding the optics and/or the pixel array.

In some embodiments, the actuator 120 may cause the optical path to oscillate with a predefined amplitude. Further, the actuator 120 may receive information on the DVS, the environment of the DVS, and/or a maximum allowable amplitude. The information on the DVS, e.g., is indicative of its sensitivity and/or spatial resolution. The information on the environment, e.g., is indicative of a measure of a contrast in the environment and/or a distance and/or size or width of an object and/or contrast in the environment. The further away and the smaller the objects and/or contrasts are, the "more difficult" is it for the DVS to see them, i.e. the DVS may detect fewer events representing objects and/or contrasts the further away and the smaller they are, if the optical path vibrates with a constant amplitude. Also, the lower a spatial resolution and/or sensitivity of the DVS, the more difficult it is to see the contrasts and/or objects for a given amplitude. To compensate for this at least partially, the actuator 120 may adjust the amplitude based on the information on the environment and/or the information on the DVS. The actuator 120, e.g., increases the amplitude the lower the spatial resolution and/or sensitivity, and/or the further away and the fainter an object and/or a contrast is.

Alternatively, or additionally, the control circuit 130 may adjust the amplitude based on the information on the maximum allowable amplitude. The maximum allowable amplitude, e.g., is defined by a use case of the DVS 110. In handheld devices, the maximum amplitude, e.g., is defined such that a user of such a device does not recognize or feel disturbed by the vibration up to the maximum amplitude. Hence, the actuator 120, e.g., adjusts the amplitude of the vibration based on the information on the maximum allowable amplitude such that the vibration does not disturb the user.

The control circuit 130, e.g., is coupled to the DVS 110 to receive measurement data indicative of the events from the DVS 110 and to adjust the DVS 110 based on the one or more events. The one or more events, e.g., indicate a quality of images of the captured environment taken by the DVS 110. Thus, the control circuit 130 can determine based on the one or more events whether settings affecting the quality of images are set properly.

Further, the control circuit 130 may adjust the settings of the DVS 110 to enhance the quality of images taken by the DVS 110. In order to do so, the control circuit 130 may adjust a sensitivity of the DVS 110, optics of the DVS 110, and/or settings affecting a processing (e.g. parameters for correction of an optical aberration) of events detected by the DVS 110 based on the detected events.

The sensitivity of the DVS 110 can be understood as a measure of stimulation necessary to make pixels of the DVS 110 detect an event. To adjust the sensitivity of one or more pixels, the control circuit 130, e.g., adjusts bias settings, e.g., a bias voltage or current, defining the sensitivity.

Optionally, the control circuit 130 is configured to adjust optics of the DVS 110 based on the events. The control circuit 130, e.g., determines and adjusts a focus of the optics 112 based on the events.

The proposed concept, e.g., allows a calibration of a DVS.

Figure 2A:
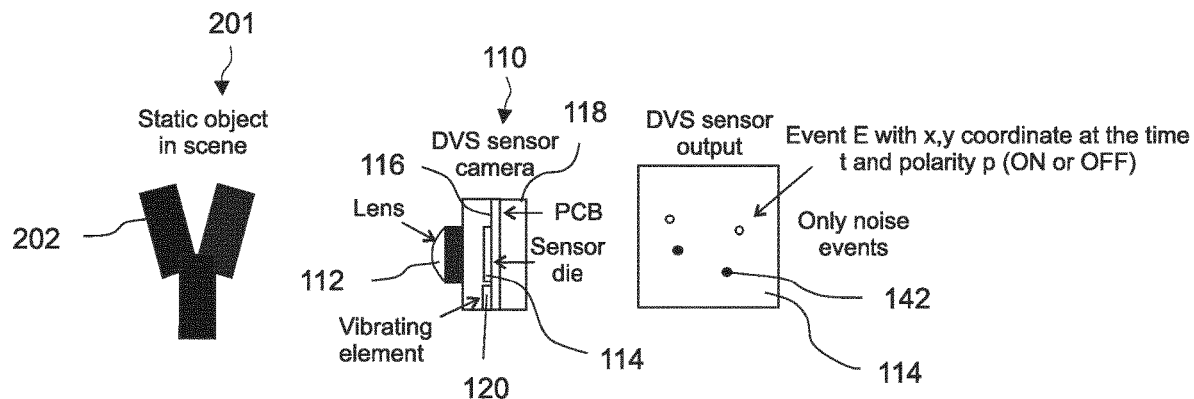
FIGS. 2a, 2b and 2c illustrate an application of the proposed concept.
Figure 2B:
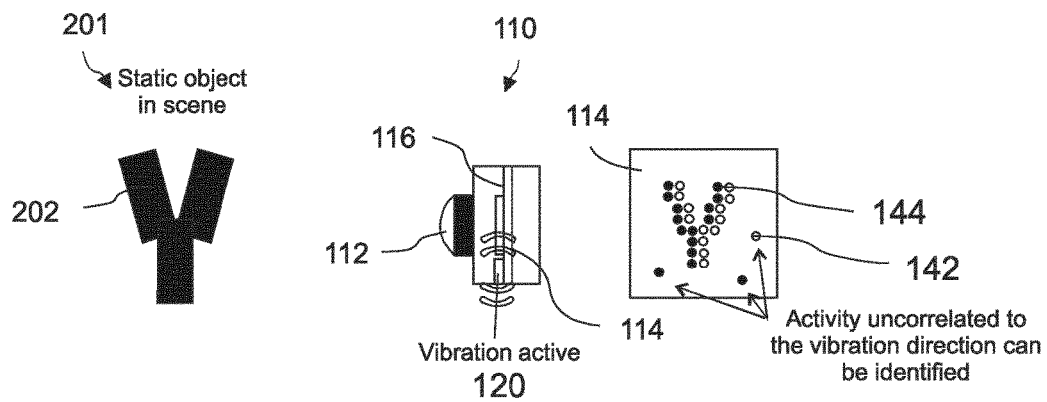
Figure 2C:
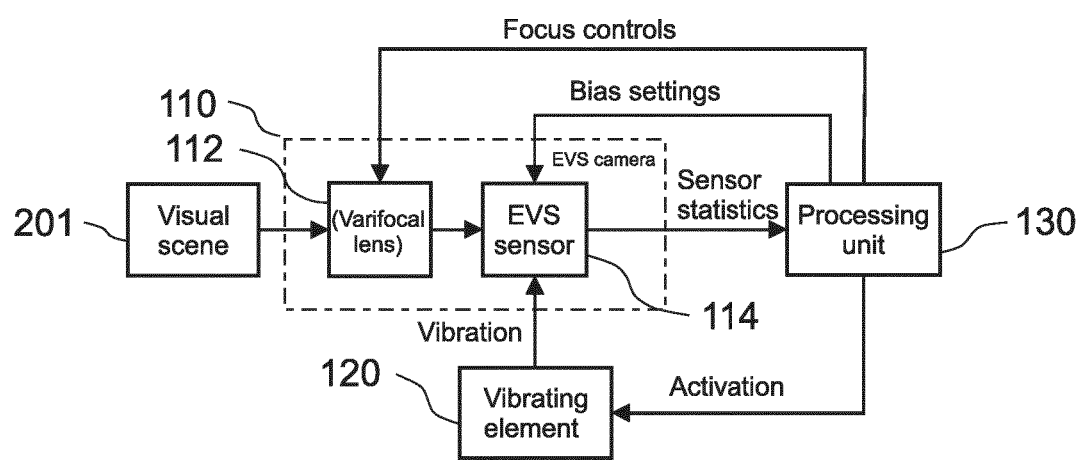

FIGS. 2*a*, 2*b*, and 2*c* illustrate an application of the proposed concept. In particular, FIG. 2*c* illustrates a block diagram schematically illustrating an embodiment of the apparatus 110 and FIGS. 2*a* and 2*b* schematically illustrate a use case of the proposed concept.

As can be seen from FIGS. 2*a* to 2*c*, the DVS 110 comprises optics 112 and a pixel array 114. The optics 112, e.g., guide light from an object 202 in the captured environment 201 to the pixel array 114. The pixel array 114 is mounted on a printed circuit board (PCB) 116 together with the actuator 120 for a space-efficient implementation. The actuator 120, e.g., is configured to make the PCB 116 and the pixel array 114 vibrate to change the optical path of the light from object 202 relative to the pixel array 114. To this end, the actuator 120 may comprise or correspond to a vibrating element. The vibrating element, e.g., comprises a piezoelectric material which can be electrically excited to vibrate.

On the right in FIG. 2*a* and FIG. 2*b*, a schematic front view of the pixel array 114 is shown.

FIG. 2*a* illustrates a situation in which the actuator 120 is not activated. Hence, the optical path is not changed relative to the pixel array 114. Assuming that object 202 is steady and the illumination of object 202 is constant, the light and/or contrasts from object 202 projected onto the pixel array 114 do not change significantly, such that the pixel array 114 cannot detect changes in illumination. Hence, the pixel array 114 may not detect any or sufficiently many events representing object 202 for calibrating the DVS 110 based thereon. The pixel array 114, e.g., detects a number of noise events 142, as schematically indicated by the front view of the pixel array 114 on the right in FIG. 2*a*. In static scenes, it may not be possible to differentiate the noise events 142 from events representing the captured environment 201. Thus, e.g., the noise events 142 alone may not be suitable for calibrating the DVS 110.

In some applications, it is desired to calibrate the DVS 110 also when the DVS 110 monitors a steady scene and, e.g., merely steady objects.

To this end, the actuator 120 can make the PCB 116 and/or the pixel array 114 to vibrate/oscillate, as illustrated in FIG. 2*b*. Thus, the optical path of the light from object 202 oscillates relative to the pixel array 114 and, also, a position where the light from object 202 impinges on the pixel array 114. In particular, the position of the light may oscillate enough for the pixel array 114 to detect events 144 representing object 202. The actuator 120, e.g., makes the optical path oscillate linearly, e.g., sideways, in the horizontal direction. In this way, contrasts in the horizontal direction may be captured. Alternatively, or additionally, the actuator 120 may let the optical path oscillate in other directions (e.g. vertically) or let the optical path rotate. This, e.g., allows the DVS 110 to also capture contrasts in the other directions. As schematically illustrated in FIG. 2*c*, the control circuit 130, e.g., controls the actuator 120 to start and/or stop motions or oscillations of the optical path relative to the pixel array 114.

When the optical path oscillates, the events 144 may comprise a number of ON-events (white dots), where the illumination of a pixel increases, and OFF-events (black dots) where the illumination of a pixel decreases. As illustrated in FIG. 2*b*, the events 144, e.g., comprise pairs of an ON- and a related OFF-event of adjacent pixels of the pixel array 114. In this way, contrasts and/or contrast edges of object 202 are projected onto the pixel array 114.

Subsequently, the DVS 110 assigns the events 144 and 142 each to a respective position where a respective event was detected and signals the events 142, 144 together with the positions to the control circuit 130 (not shown in FIGS. 2*a* and 2*b*). The control circuit 130 can generate an event image of object 202 using the events 142, 144 and the respective positions. Further, the control circuit 130 can adjust the DVS 110 based on the events 144 (and 142).

As described in more detail below, the control circuit 130, e.g., determines an amount of noise events and/or a polarity ratio and adjusts the sensitivity based on the amount of noise events and/or the polarity ratio for calibrating the sensitivity.

In order to determine the amount of noise events, the control circuit 130 can distinguish the events 144 from the noise events 142 based on the (predefined) direction in which the optical path was changed. In order to do so, the control circuit 130 may check whether and which of the events 142 and 144 were detected by adjacent pixels and/or align with one or more other events in this direction. In contrast to the noise events 142, the events 144 resulting from changing the optical path occur at adjacent pixels and/or align with one or more other of the events 144 in the said direction. Thus, the control circuit 130, e.g., can differentiate the noise events 142 from the events 144 based on the direction in which the optical path changes and, e.g., their positions. For example, those events which align with one or more other events in the predefined direction are deemed to be events resulting from changing the optical path and events which do not align with any other event in the said direction are deemed to be noise events. Thus, the control circuit 130 can determine an amount of the noise events 142. If the brightness of the captured environment 201 and/or sensitivity of the DVS 110 is too high, the amount of noise events may be undesirably high and, e.g., significantly affects image quality. Accordingly, the control circuit 130, e.g., decreases the sensitivity if the amount of noise events is too high and, e.g. exceeds a predefined threshold. To adjust the sensitivity, the control circuit 130, e.g., adjusts the bias settings.

As described above, the events 144 align with one or more other events in the direction in which the optical path changes. Thus, the control circuit 130 can obtain the direction in which the optical path changes from the positions of the events. For example, the control circuit 130 can obtain this direction from relative positions of an ON- and OFF-event of one or more of the above pairs of events. In order to do so, control circuit 130, e.g., applies an algorithm for determining an optical flow in the event image.

Additionally, or alternatively, the control circuit 130 can adjust the sensitivity based on the polarity ratio of a number of events indicative of a first polarity and a number of events indicative of a second polarity. For this, the control circuit 130 can determine from the events 144 a number of events having the first polarity and a number of events having the second polarity. The events having the first polarity, e.g., are ON-events and the events having the second polarity, e.g., are OFF-events. Theoretically, if the optical path oscillates periodically and the sensitivity is set properly, the number of ON- and OFF-events in the events 144 is balanced and the polarity ratio, e.g., is equal to 1. Otherwise, if the sensitivity is set improperly, the number of ON- and OFF-events may not be balanced and the polarity ratio, e.g., is below or above 1. In this case, the control circuit 130 may adjust and/or calibrate the sensitivity to increase or decrease the polarity ratio to 1.

Also, the control circuit 130 may remove the noise events 142 from the event image of the captured environment 201 to increase the image quality.

Further, the control circuit 130 can adjust the optics 112 based on the events 144. In particular, the control circuit 130 may adjust the focus of the optics 112 based on the events 144. For this, the control circuit 130, e.g., determines based on the events 144 a contrast in the image of the captured environment 201 and object 202. In theory, the focus is optimal when the contrast is maximum. Thus, the control circuit 130 may adjust and/or adjust the focus of the optics 112 based on the contrast and, e.g., so as to (ideally) maximize or at least increase the contrast and enhance or optimize the focus. To this end, the optics 112, e.g., has a variable focus. For example, the optics 112 comprise a varifocal lens and/or further and/or other optic components with variable focus.

Further, the control circuit 130 may adjust a processing of events detected by the DVS 110 based on the events 144. For example, the control circuit 130 adjusts parameters for correction of optical aberrations in the event image based on the events 144. The optical aberrations in the event image, comprise defocus aberration, spherical aberration, coma, astigmatism, Petzval field curvature, and image distortion.

The control circuit 130, e.g., receives a reference image of the environment 201. The reference image, e.g., reflects the captured environment 201, e.g. object 202, without or less optical aberrations than the DVS 110. Object 202, e.g., has a checkered contrast pattern and the reference image ideally reflects it without or less distortions in the checkered contrast pattern. Further, the control circuit 130 may adjust the parameters for correction of optical aberrations in the event image based on a deviation of the event image from the reference image. Due to optical aberrations in the event image, the checkered contrast pattern in the event image may deviate from the checkered pattern in the reference image due to optical aberrations. In order to determine the deviation, the control circuit 130, e.g., compares checkered contrast pattern in the event image and the checkered contrast pattern in the reference image. In this way, the control circuit 130 can determine characteristics of the optical aberration in the event image. Subsequently, the control circuit 130, e.g., adjusts the parameters in an algorithm for correction of optical aberrations based on the determined characteristics to enhance the correction of optical aberrations in the DVS 110.

The above described calibration may enhance the image quality of images taken by the DVS 110.

The DVS 110, the actuator 120 and/or the control circuit 130 may be triggered (to act in the above described manner) periodically and/or automatically when one or more predefined conditions are met. The conditions, e.g., are fulfilled if a detected activity (an amount of detected events) in the captured environment 201 is relatively low or high, e.g. lower or higher than a predefined threshold for a predefined period of time. The idea behind this is that the sensitivity might be too low or too high when the activity is too low or high. Also, the conditions may be fulfilled when the brightness of the captured environment changes.

In order to trigger the DVS 110, the actuator 120 and/or the control circuit 130 in the above manner, the control circuit 130 may obtain information on a change in brightness of the captured environment 201, on noise events detected by the pixel array 114, and/or on a user request for adjustment of the DVS 110. Subsequently, the control circuit 130 may cause the actuator 120 to change the optical path of the light relative to the pixel array 114 based on the information and cause the pixel array 114 to detect one or more events resulting from the actuator 120 changing the optical path of the light relative to the pixel array 114 based on the information for adjusting the DVS 110 based on the one or more events.

The control circuit 130, e.g., receives the user request from a user interface coupled to the control circuit 130. In response, the control circuit 130 may be triggered and trigger the actuator 120 and the DVS 110 to act in the above described manner.

Information on noise events, e.g., is indicative of an amount of noise events detected by the DVS 110 and/or another sensor.

To obtain information on a change in brightness, the control circuit 130 may receive such information form an external sensor configured to sense the brightness, e.g., a single photodiode.

The above proposed concept, e.g., is applied as follows:
1) When one or more of the above conditions for (auto-) calibration are fulfilled, the actuator 120 makes the pixel array 114 vibrate and let the DVS 110 detect events resulting from the vibration and noise events.
2) The control circuit 130 obtains the direction in which the optical path is changed (sideways motion for example) and identifies noise events which are not consistent with the said direction, i.e. noise events. The said direction may be estimated using optical flow or simpler algorithms. Subsequently, the control circuit 130 may remove such events which do not align with one or more other events in the line of motion or which do not have neighboring events at all.
3) The control circuit 130 adjusts the focus of the optics in the above described manner and based on the residual events.
4) Once the DVS 110 and its optics 112 are focused and the noise events are filtered out, an event histogram including either N events or a plurality of events detected within M seconds is obtained. The histogram, e.g., is a (2D) array. Cell values of the array are assigned to positions of pixels in the pixel array 114 and incremented for each event detected at a respective position. The histogram, thus, can be understood as sensor statistics.
5) The histogram then is used to improve the bias settings (to increase or decrease sensitivity) and to balance the polarity ratio o. Also, the sensitivity is adjusted based on the amount of noise events.

For the above described calibration, the optical path is moved (only) sideways. Optionally, the actuator 120 is configured to change the optical path in multiple directions, e.g. in vertical, horizontal direction, diagonally, and/or rotatory. Thus, the pixel array 114 can detect one or more events resulting from the actuator changing the optical path in the multiple directions. Also, the control circuit 130 can adjust the DVS 110 based on the one or more events resulting from the actuator changing the optical path in the multiple directions. This allows to capture an increased amount of contrasts and/or objects in the captured environment 201, in particular along the multiple directions, and a more precise image of the captured environment 201 from the resulting events. Thus, changing the optical path in multiple directions allows a more precise calibration based on the events resulting from changing the optical path in the multiple directions.

The skilled person having benefit from the present disclosure will appreciate that the concept proposed herein can be also implemented using various components, e.g., for the optics 112, the pixel array 114, the actuator 120, and/or the control circuit 130, which are not explicitly mentioned herein.

In embodiments the control circuit 130 may be implemented using one or more processing units, one or more processing devices, any means for processing, such as a processor, a computer or a programmable hardware component being operable with accordingly adapted software. In other words, the described functions of the control circuit 130 may as well be implemented in software, which is then executed on one or more programmable hardware components. Such hardware components may comprise a general-purpose processor, a Digital Signal Processor (DSP), a micro-controller, or the like The above described concept may be also implemented in a method.

Figure 3:
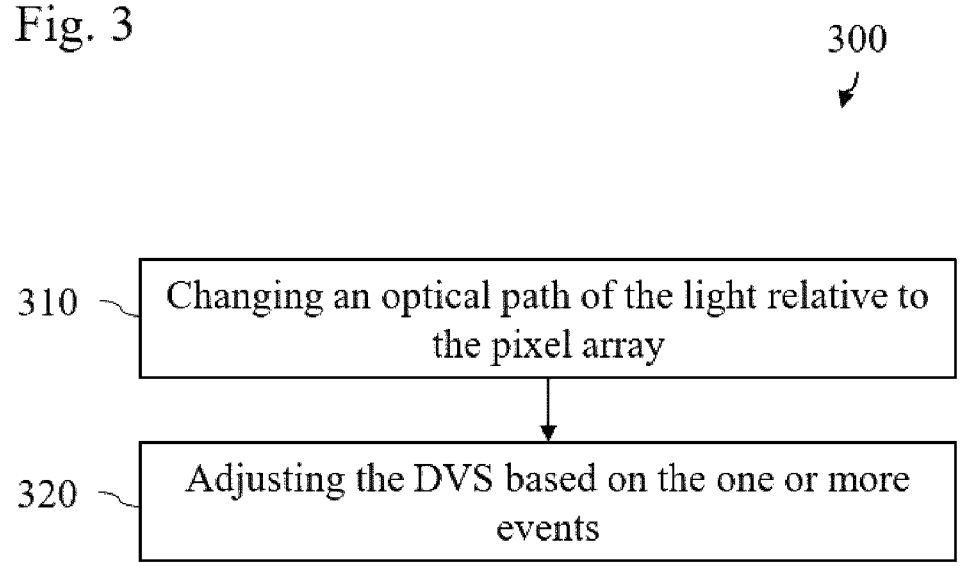
FIG. 3 illustrates a flow chart schematically illustrating an embodiment of a method for an apparatus comprising a dynamic vision sensor.

FIG. 3 illustrates a flow chart schematically illustrating an embodiment of a method 300 for adjusting a DVS.

As can be seen from the flow chart, method 300 comprises changing 310 an optical path of the light relative to the pixel array of the DVS to cause the pixel array to detect one or more events resulting from the actuator changing the optical path of the light relative to the pixel array. Also, method 300 comprises adjusting 320 the DVS based on the one or more events.

As explained previously, changing 310 the optical path relative to the pixel array, e.g., comprises moving the DVS, the pixel array, and/or optics of the DVS. For this, the DVS, the pixel array, and/or optics can be made to vibrate, e.g., using the proposed actuator.

Adjusting 320 the DVS based on the one or more events, e.g., allows to calibrate the DVS. In particular, adjusting 320 the DVS may comprise adjusting the sensitivity of the DVS, optics of the DVS, and/or parameters for correction of optical aberrations in the above described manner. Thus, the sensitivity, the optics, and/or the parameters for correction of optical aberrations may be calibrated.

Further embodiments of method 300 may also include features described in connection with apparatus 100. Another embodiment of method 300 is exemplarily shown in FIG. 4.

Figure 4:
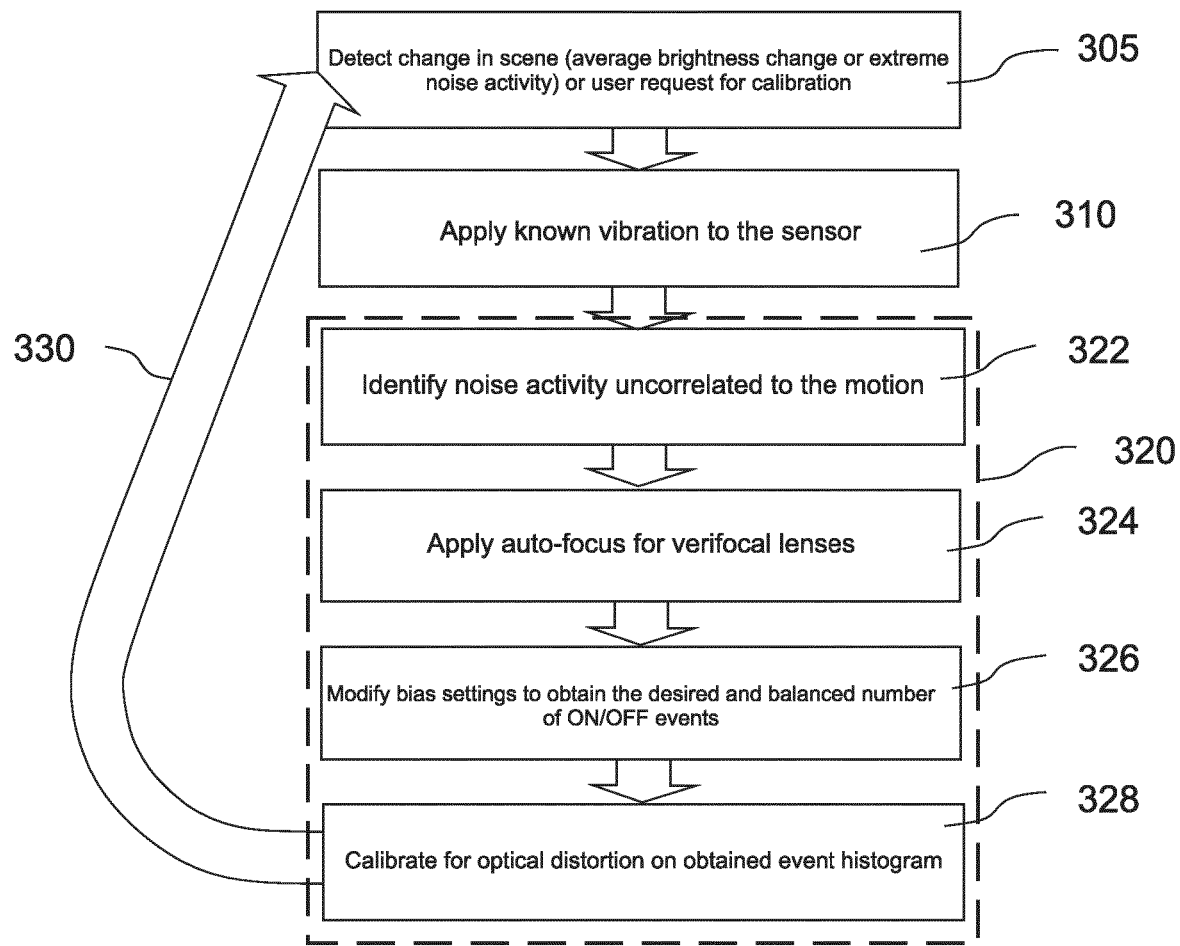
FIG. 4 illustrates a flow chart schematically illustrating another embodiment of the method.

FIG. 4 illustrates a flow chart schematically illustrating another embodiment of the method 300.

As can be seen from the flow chart in FIG. 4, method 300 optionally comprises obtaining 305 information on a change in brightness of an environment, on noise events detected by the pixel array, and/or on a user request for adjustment of the DVS and triggering the steps 310 and 320 based on this information. The information indicates, e.g., a change (e.g. above a respective threshold) in the brightness of the (captured) environment, an amount of noise events, and/or whether a user requested the calibration of the DVS. Subsequently, the steps 310 and 320 are triggered if the change in the brightness and/or the amount of noise events exceed a respective predefined threshold and/or if the user requests it.

Subsequently, steps 310 and 320 may be triggered due to one or more of the aforementioned reasons. Changing 310 the optical path, e.g., comprises applying vibration to the pixel array of the DVS. Additionally, or alternatively, changing 310 the optical path may comprise moving the DVS and/or optics of the DVS, e.g., by applying vibration to them. Thus, the DVS is enabled to detect events representing the captured environments even if the captured environment is steady.

As can be seen from the flow chart, adjusting 320 may comprise identifying or determining 322 noise activity (i.e. an amount of noise events). This, e.g., provides for differentiating between noise events and events resulting from changing 310 the optical path, as previously described in connection with apparatus 100.

Further, adjusting 320 the DVS may comprise adjusting or calibrating 324 a focus of optics (e.g. of one or more varifocal lenses of the optics) of the DVS based on the events resulting from changing 310 the optical path. As explained above, the focus, e.g., is adjusted based on a contrast of an event image obtained from those events.

As indicated by arrow 330, the proposed concept may be executed iteratively.

Further, adjusting 320 the DVS may comprise adjusting a sensitivity of the DVS. Adjusting the sensitivity, e.g., comprises modifying or adjusting 326 the sensitivity such that the polarity ratio of ON- and OFF-events is balanced, i.e. that the number of ON- and OFF-events is equal.

Also, adjusting 320 the DVS may comprise adjusting 328 parameters for correction of optical aberrations, e.g., based on the events resulting from changing 310 the optical path. For this, e.g., the aforementioned histogram indicative of those events may be used.

In practice, the proposed concept may be used for applications (e.g. events cameras) in mobile phones and, in particular, for auto-calibration. In applications in mobile phones, other sensors (i.e. other than the DVS) of the mobile phone can advantageously used to obtain the information on the change in brightness. In such applications, a small vibration in the range of a few (tens, hundreds) of micrometer and for a few milliseconds may be sufficient for the proposed concept and not to disturb a user of the mobile phone.

The proposed concept can be also used in surveillance applications, e.g. in surveillance cameras. In such applications, a periodic calibration in the described manner can enable the surveillance camera to operate correctly in various lighting conditions.

Further embodiments pertain to:
(1) An apparatus for a dynamic vision sensor, DVS, configured to detect changes of light impinging on a pixel array of the DVS, the apparatus comprising:
    an actuator configured to change an optical path of the light relative to the pixel array of the DVS to cause the pixel array to detect one or more events resulting from the actuator changing the optical path of the light relative to the pixel array; and
    a control circuit configured to adjust the DVS based on the one or more events.
(2) The apparatus of (1), wherein the actuator is configured to cause the optical path to oscillate for changing the optical path relative to the pixel array.
(3) The apparatus of (2), wherein the actuator is configured to
    cause the optical path to oscillate with a predefined amplitude;
    receive information on the DVS, the environment of the DVS, and/or a maximum allowable amplitude; and
    adjust the amplitude based on the information.

(4) The apparatus of any one of (1) to (3), wherein the actuator is configured to move the pixel array to change the optical path of the light relative to the pixel array.
(5) The apparatus of (4), wherein the DVS comprises an in-body stabilization device configured to generate a magnetic field to hold the pixel array in the magnetic field, wherein the actuator is configured to modify the magnetic field to change an optical path of the light relative to the pixel array.
(6) The apparatus of any one of (1) to (5), wherein the actuator is configured to move optics in the optical path to change the optical path relative to the pixel array.
(7) The apparatus of any one of (1) to (6), wherein the control circuit is configured to adjust, based on the one or more events, a sensitivity of one or more pixels of the pixel array to adjust the DVS.
(8) The apparatus of (7),
wherein the actuator is configured to change the optical path in at least one predefined direction,
wherein the control circuit is configured to distinguish, based on the predefined direction, one or more noise events from one or more events detected by the pixel array resulting from the actuator changing the optical path in the predefined direction, and
wherein the control circuit is configured to adjust the sensitivity based on the noise events.
(9) The apparatus of (7) or (8),
wherein the control circuit is configured to:
determine from the events a polarity ratio of a number of events indicative of a first polarity and a number of events indicative of a second polarity; and
adjust the sensitivity based on the polarity ratio.
(10) The apparatus of any one of (1) to (9), wherein the control circuit is configured to adjust optics of the DVS based on the one or more events.
(11) The apparatus of any one of (1) to (10),
wherein the actuator is configured to change the optical path in multiple directions,
wherein the pixel array is configured to detect one or more events resulting from the actuator changing the optical path in the multiple directions, and
wherein the control circuit is configured to adjust the DVS based on the one or more events resulting from the actuator changing the optical path in the multiple directions.
(12) The apparatus of any one of (1) to (11), wherein the control circuit is configured to:
generate an event image of an environment of the DVS based on the one or more events;
receive a reference image of the environment; and
adjust parameters for correction of optical aberrations in the event image based on a deviation of the event image from the reference image.
(13) The apparatus of any one of (1) to (12), wherein the control circuit is further configured to:
obtain information on a change in brightness of an environment, on noise events detected by the pixel array, and/or on a user request for adjustment of the DVS;
cause the actuator to change the optical path of the light relative to the pixel array based on the information; and
cause the pixel array to detect one or more events resulting from the actuator changing the optical path of the light relative to the pixel array based on the information for adjusting the DVS based on the one or more events.
(14) Method for adjusting a dynamic vision sensor, DVS, configured to detect changes of light impinging on a pixel array of the DVS, the method comprising:
changing an optical path of the light relative to the pixel array of the DVS to cause the pixel array to detect one or more events resulting from the actuator changing the optical path of the light relative to the pixel array; and
adjusting the DVS based on the one or more events.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. An apparatus for a dynamic vision sensor, DVS, configured to detect changes of light impinging on a pixel array of the DVS, the apparatus comprising:
    an actuator configured to change an optical path of the light relative to the pixel array of the DVS to cause the pixel array to detect one or more events resulting from the actuator changing the optical path of the light relative to the pixel array, wherein the actuator is configured to change the optical path in at least one predefined direction; and
    a control circuit configured to
        distinguish, based on the predefined direction, one or more noise events from one or more events detected by the pixel array resulting from the actuator changing the optical path in the predefined direction, and
        adjust a sensitivity of one or more pixels of the pixel array to adjust the DVS based on the noise events.

2. The apparatus of claim 1, wherein the actuator is configured to cause the optical path to oscillate for changing the optical path relative to the pixel array.

3. The apparatus of claim 2, wherein the actuator is configured to
    cause the optical path to oscillate with a predefined amplitude;
    receive information on the DVS, the environment of the DVS, and/or a maximum allowable amplitude; and
    adjust the amplitude based on the information.

4. The apparatus of claim 1, wherein the actuator is configured to move the pixel array to change the optical path of the light relative to the pixel array.

5. The apparatus of claim 4, wherein the DVS comprises an in-body stabilization device configured to generate a magnetic field to hold the pixel array in the magnetic field, wherein the actuator is configured to modify the magnetic field to change an optical path of the light relative to the pixel array.

6. The apparatus of claim 1, wherein the actuator is configured to move optics in the optical path to change the optical path relative to the pixel array.

7. The apparatus of claim 1, wherein the control circuit is configured to decrease the sensitivity of one or more pixels of the pixel array to adjust the DVS if an amount of noise events exceeds a predefined threshold.

8. The apparatus of claim 1,
    wherein the control circuit is configured to check which of the events detected by adjacent pixels and/or align with one or more other events in this direction and events which do not align with any other event in the said direction are deemed to be
    noise events.

9. The apparatus of claim 1,
    wherein the control circuit is configured to:
        determine from the events a polarity ratio of a number of events indicative of a first polarity and a number of events indicative of a second polarity; and
        adjust the sensitivity based on the polarity ratio.

10. The apparatus of claim 1, wherein the control circuit is configured to adjust optics of the DVS based on the noise events.

11. The apparatus of claim 1,
    wherein the actuator is configured to change the optical path in multiple directions,
    wherein the pixel array is configured to detect one or more events resulting from the actuator changing the optical path in the multiple directions, and
    wherein the control circuit is configured to adjust the DVS based on the noise events resulting from the actuator changing the optical path in the multiple directions.

12. The apparatus of claim 1, wherein the control circuit is configured to:
    generate an event image of an environment of the DVS based on the one or more events;
    receive a reference image of the environment; and
    adjust parameters for correction of optical aberrations in the event image based on a deviation of the event image from the reference image.

13. The apparatus of claim 1, wherein the control circuit is further configured to:
    obtain information on a change in brightness of an environment, on noise events detected by the pixel array, and/or on a user request for adjustment of the DVS;
    cause the actuator to change the optical path of the light relative to the pixel array based on the information; and
    cause the pixel array to detect one or more events resulting from the actuator changing the optical path of the light relative to the pixel array based on the information for adjusting the DVS based on the noise events.

14. Method for adjusting a dynamic vision sensor, DVS, configured to detect changes of light impinging on a pixel array of the DVS, the method comprising:
    changing, using an actuator, an optical path of the light relative to the pixel array of the DVS in at least one predefined direction to cause the pixel array to detect one or more events resulting from the actuator changing the optical path of the light relative to the pixel array;
    distinguishing, based on the predefined direction, noise events from one or more events detected by the pixel array resulting from the actuator changing the optical path in the predefined direction; and
    adjusting a sensitivity of one or more pixels of the pixel array to adjust the DVS based on the noise events.

15. The method of claim 14, further comprising:
    determining whether an amount of noise events exceeds a predefined threshold; and
    in response to the amount of noise events exceeds the predefined threshold, decreasing the sensitivity of one or more pixels of the pixel array, otherwise maintaining the sensitivity of one or more pixels of the pixel array.

16. The method of claim 14, further comprising:
    checking which of the events detected by adjacent pixels and/or align with one or more other events in this direction;
    determining events which do not align with any other event in the said direction as noise events; and
    determining events which do align with any other event in the said direction are deemed not to be noise events.

17. The method of claim 14, furthering comprising:
    determining from the events a polarity ratio of a number of events indicative of a first polarity and a number of events indicative of a second polarity; and
    adjusting the sensitivity based on the polarity ratio.

18. The method of claim 14, furthering comprising:
    controlling the actuator to change the optical path in multiple directions, wherein the pixel array is configured to detect one or more events resulting from the actuator changing the optical path in the multiple directions, and adjusting the DVS based on the noise events resulting from the actuator changing the optical path in the multiple directions.

19. A non-transitory computer readable medium storing instructions for causing a computer to perform the method of claim 14.

20. An apparatus for a dynamic vision sensor, DVS, configured to detect changes of light impinging on a pixel array of the DVS, the apparatus comprising:

an actuator configured to change an optical path of the light relative to the pixel array of the DVS to cause the pixel array to detect one or more events resulting from the actuator changing the optical path of the light relative to the pixel array; and a control circuit is configured to:
determine from the events a polarity ratio of a number of events indicative of a first polarity and a number of events indicative of a second polarity; and
adjust a sensitivity of one or more pixels of the pixel array based on the polarity ratio.

\* \* \* \* \*